United States Patent [19]

Okazaki et al.

[11] Patent Number: 4,533,107
[45] Date of Patent: Aug. 6, 1985

[54] SEAT TRACK APPARATUS FOR VEHICLE SEAT

[75] Inventors: Hiroshi Okazaki; Motoi Hyodo, both of Toyota, Japan

[73] Assignee: Aisin Seiki Kabushiki Kaisha, Kariya, Japan

[21] Appl. No.: 458,036

[22] Filed: Jan. 14, 1983

[30] Foreign Application Priority Data

Jan. 21, 1982 [JP] Japan .................................. 57-7850

[51] Int. Cl.³ ............................................. F16M 13/00
[52] U.S. Cl. .................................................. 248/430
[58] Field of Search ............... 248/424, 429, 430, 544; 308/3 R

[56] References Cited

U.S. PATENT DOCUMENTS

| | | | |
|---|---|---|---|
| 1,864,150 | 6/1932 | Shields | 248/544 |
| 2,780,501 | 2/1957 | Rosenberg | 308/3 R |
| 2,789,675 | 4/1957 | Gebauer | 308/3 R X |
| 3,157,441 | 11/1964 | Pickles | 248/430 X |
| 4,109,973 | 8/1978 | Terada | . |
| 4,194,793 | 3/1980 | Offermans | 308/3.8 |
| 4,228,981 | 10/1980 | Rampel | 248/430 |

Primary Examiner—William H. Schultz
Attorney, Agent, or Firm—Oblon, Fisher, Spivak, McClelland & Maier

[57] ABSTRACT

A seat track apparatus for a seat of a vehicle having a chamber floor which includes an upper rail fixedly attached to a lower portion of the vehicle seat and having a reverse U-shaped cross-sectional configuration so as to form opposed shoulders and opposed side walls and including a first pair of projecting portions longitudinally projecting from the opposed shoulders and a second pair of projecting portions longitudinally, laterally projecting from the opposed side walls, and a lower rail fixedly attached to the floor of the vehicle chamber and having a U-shaped cross-sectional configuration and including a pair of upper flanges at an upper end portion thereof and a pair of projecting portions corresponding to the pair of projecting portions of the upper rail at the opposed side walls.

8 Claims, 11 Drawing Figures

SEAT TRACK APPARATUS FOR VEHICLE SEAT

BACKGROUND OF THE INVENTION

1. Field of the Invention

The present invention relates to a seat track apparatus, and more particularly to a seat track apparatus for vehicle seats.

2. Description of the Prior Art

In a conventional seat track apparatus for vehicle seats, for example, in FIGS. 1–3, an upper rail 13 which has a reverse U-cross-sectional configuration and is fixedly attached to a lower portion of a seat portion 11 of a seat 10, receives a lower rail 12 therein, which has U-cross-sectional configuration and is fixedly connected to a floor of a vehicle chamber. The upper rail 13 is movably connected to the lower rail 12 along the longitudinal direction and is supported on the lower rail 12 by rollers 14 for bearing at forward and rearward portions. The upper rail 13 is guided so as to move parallel to the lower rail 12 by a pair of ball bearings 15, 15 arranged at opposite sides of roller 14. In the above-mentioned apparatus, a clearance c exists longitudinally between upper faces of upper flanges 12a, 12a of the lower rail 12 and lower face of the upper rail 13 and furthermore the pair of ball bearings 15, 15 are supported by lower flanges 13a, 13a of the upper rail 13, so that when a large load is upwardly acted on the upper rail 13 as shown in FIG. 4, the lower flanges 13a, 13a of the upper rail 13 are bent downwardly and the upper rail 13 shifts in an upward direction and upper flanges 12a, 12a of the lower rail 12 are upwardly bent as shown in FIG. 5. As a result, the rearward portion of the upper rail 13 is in turn upwardly bent and deformed. Thus this conventional seat track apparatus is accompanied by drawbacks regarding the strength of the upper and lower rail 13, 12.

SUMMARY OF THE INVENTION

An object of the present invention is to therefore provide an improved seat track apparatus for vehicle seats which obviates the aforementioned drawbacks of the described conventional seat track apparatus.

A further object of the present invention is to provide an improved seat track apparatus for vehicle seats which can be reliably moved.

A still further object of this invention is to provide an improved seat track apparatus for vehicle seats which is relatively simple and includes a minimum number of parts.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
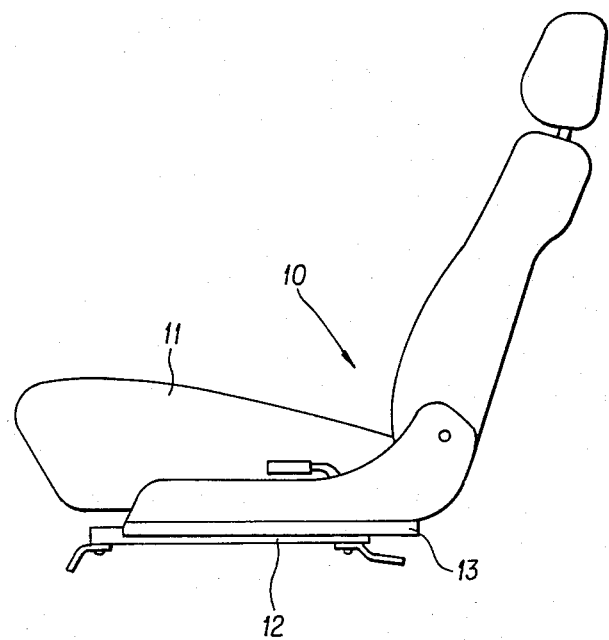
FIG. 1 is a side elevational view which shows a vehicle seat.
Figure 2:
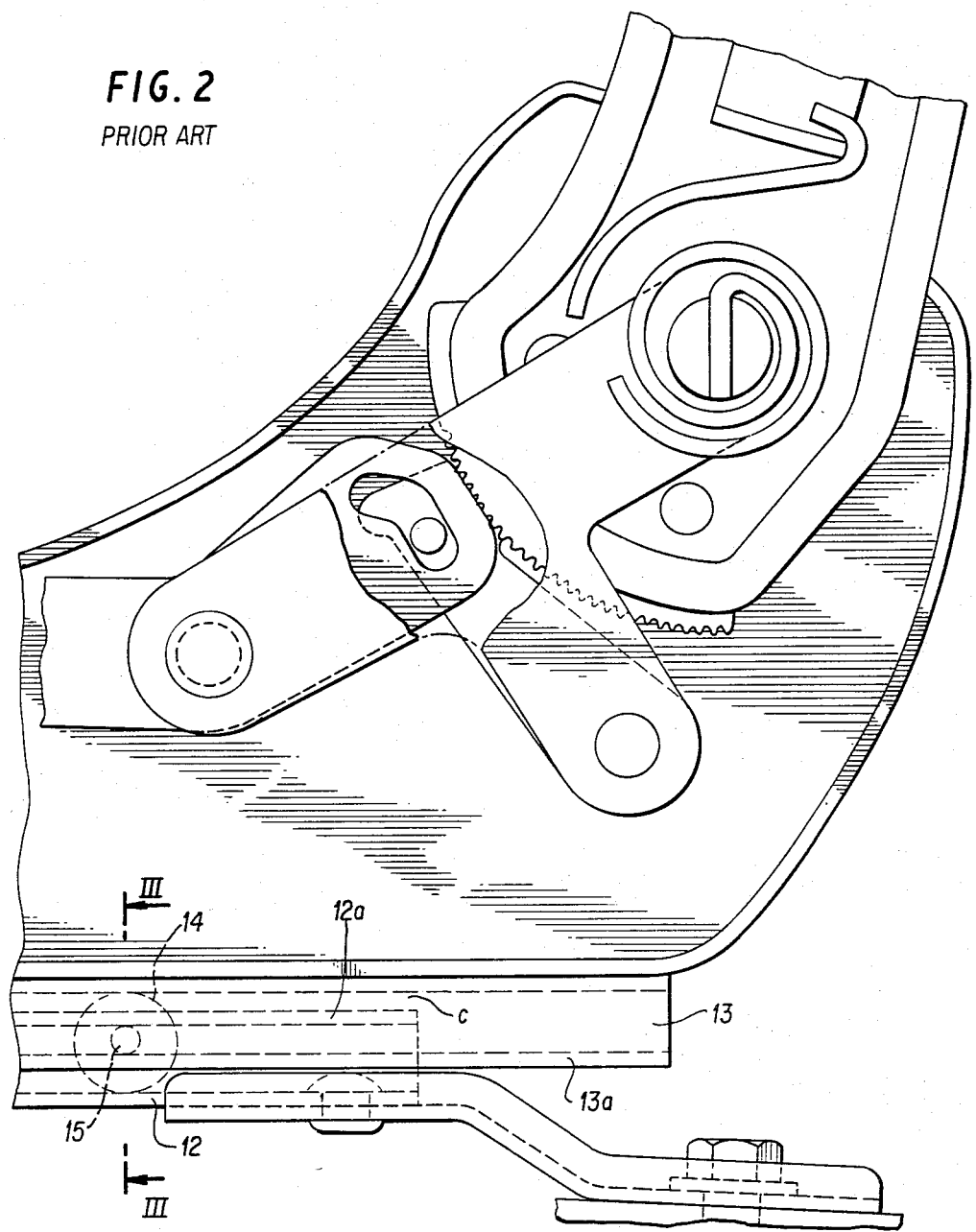
FIG. 2 is a lateral view which shows a conventional seat track apparatus.
Figure 5:
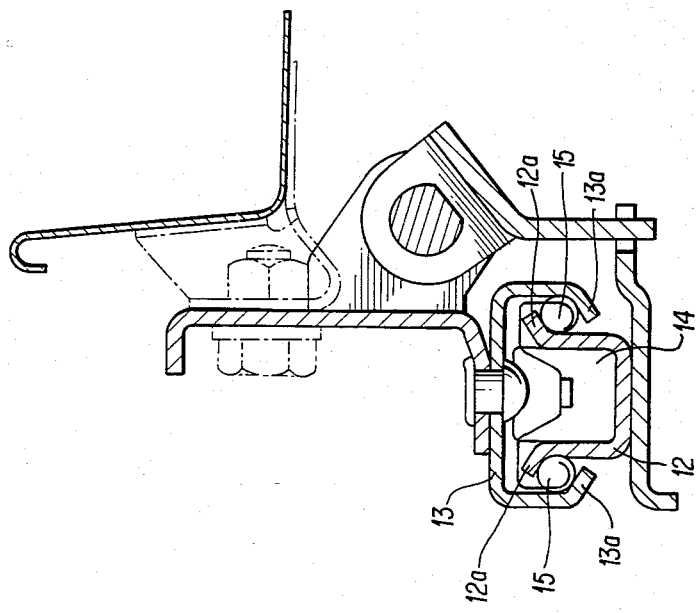
FIG. 5 is a sectional view taken along the line V—V in FIG. 4.
Figure 3:
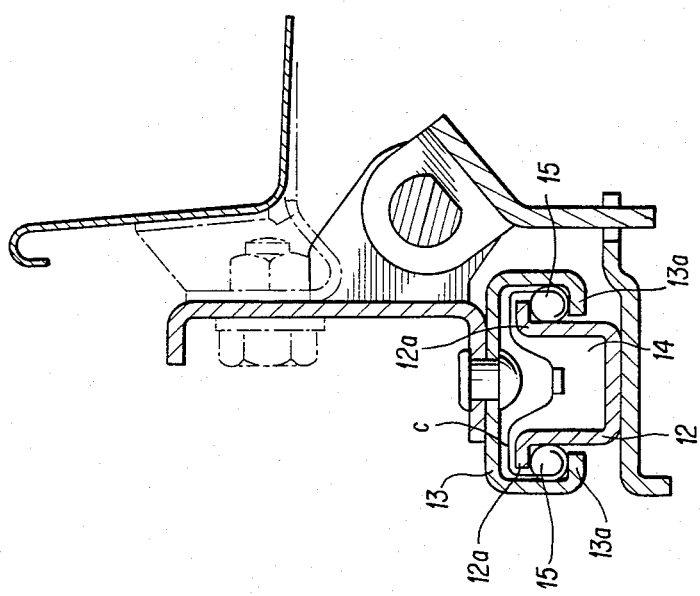
FIG. 3 is a sectional view taken along the line III—III in FIG. 2.
Figure 4:
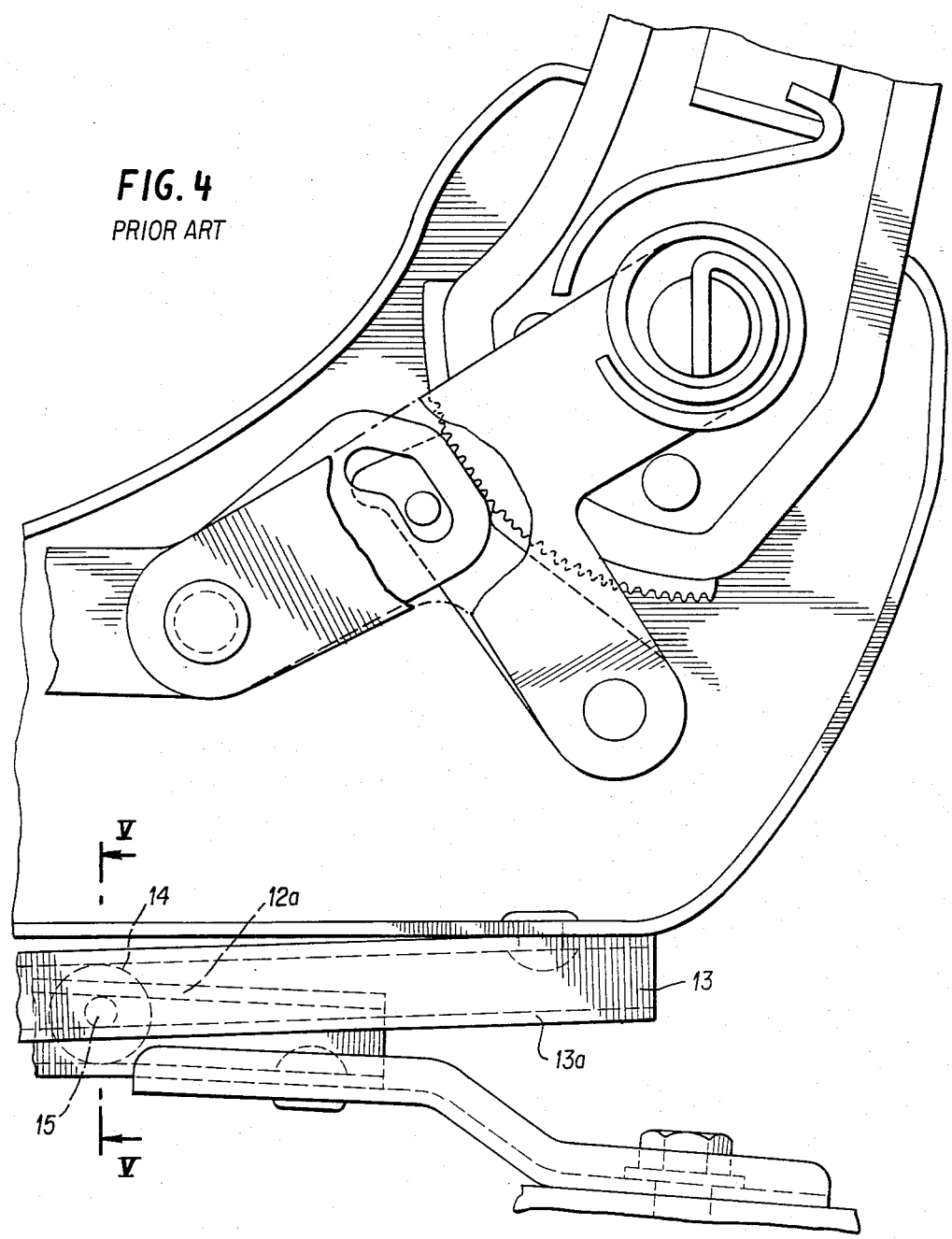
FIG. 4 is a lateral view which shows a transformed state according to the seat track apparatus in FIG. 2.
Figure 6:
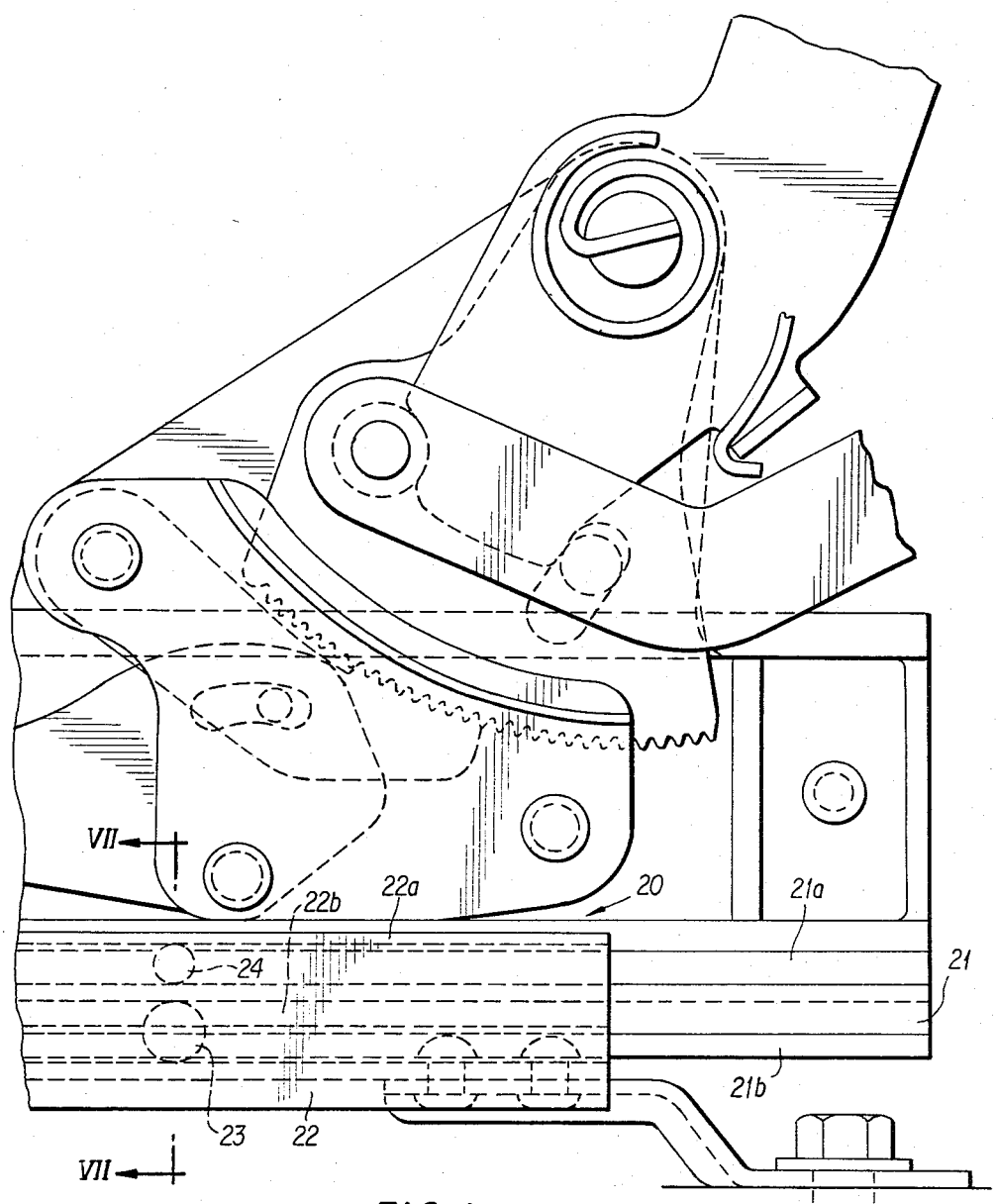
FIG. 6 is a lateral view which shows a seat track apparatus according to the present invention.
Figure 7:
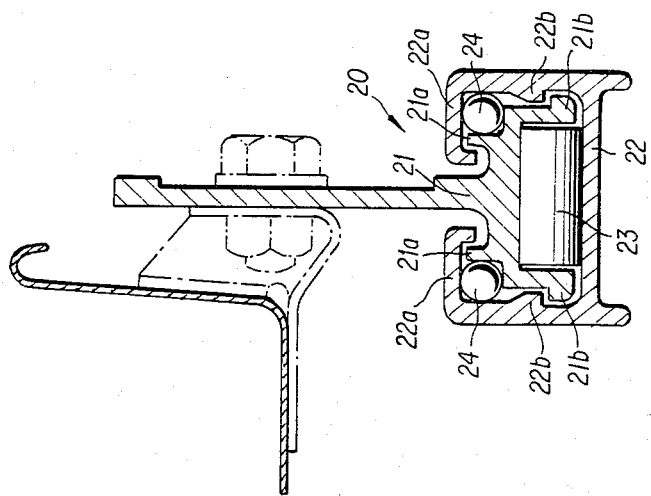
FIG. 7 is a sectional view taken along the line VII—VII in FIG. 6.

Referring now to FIGS. 6 and 7, reference numeral 20 denotes a seat track apparatus for vehicle seats and includes an upper rail 21 fixedly connected to a lower portion of a vehicle seat and a lower rail 22 fixedly connected on a floor of a vehicle chamber. The upper rail 21 is assembled with the lower rail 22 so as to longitudinally move within the confines of the same. The upper rail 21 has a reverse U-shaped cross-sectional configuration and is provided with a pair of projecting portions 21a, 21a longitudinally projecting parallel with each other at both shoulders thereof and is also provided with a pair of projecting portions 21b, 21b longitudinally and laterally projected from both side walls. The lower rail 22 has a U-shaped cross-sectional configuration and is integrally formed with a pair of upper flanges 22a, 22a at an upper end thereof and is also provided with a pair of projecting portions 22b, 22b from both side walls thereof, which correspond to the projecting portions 21b, 21b of the upper rail 21. An upper face of each projecting portion 21b of the upper rail 21 is opposed to a lower face of each projecting portion 22b of the lower rail 22 with a slight clearance formed therebetween and an upper face of each projecting portion 21a of the upper rail 21 is opposed to a lower face of each upper flange 22a of the lower rail 22 with a slight clearance, respectively.

Rollers 23 are axially supported at front and rear portions of the upper rail 21 and are rollable on a bottom upper face of the lower rail 22. The upper rail 21 is smoothly movably supported on the lower rail 22 by rollers 23. A pair of ball bearings 24, 24 are rollably supported on both shoulders of the upper rail 21. The upper rail 21 is guided so as to parallel move with respect to the lower rail 22 by the ball bearings 24, 24.

Figure 9:
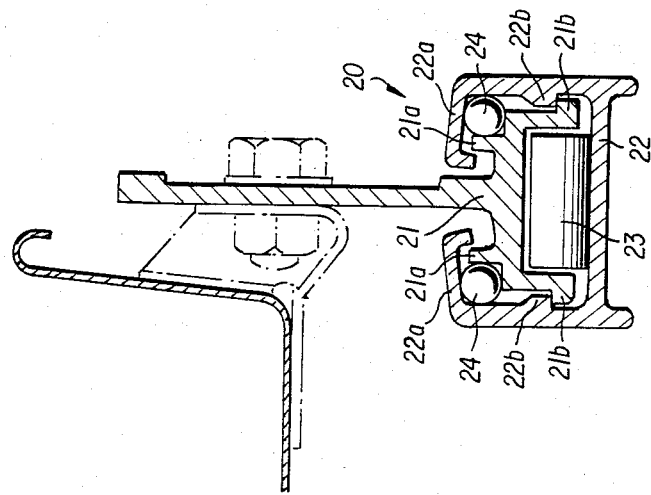
FIG. 9 is a sectional view taken along the line IX—IX in FIG. 8.
Figure 8:
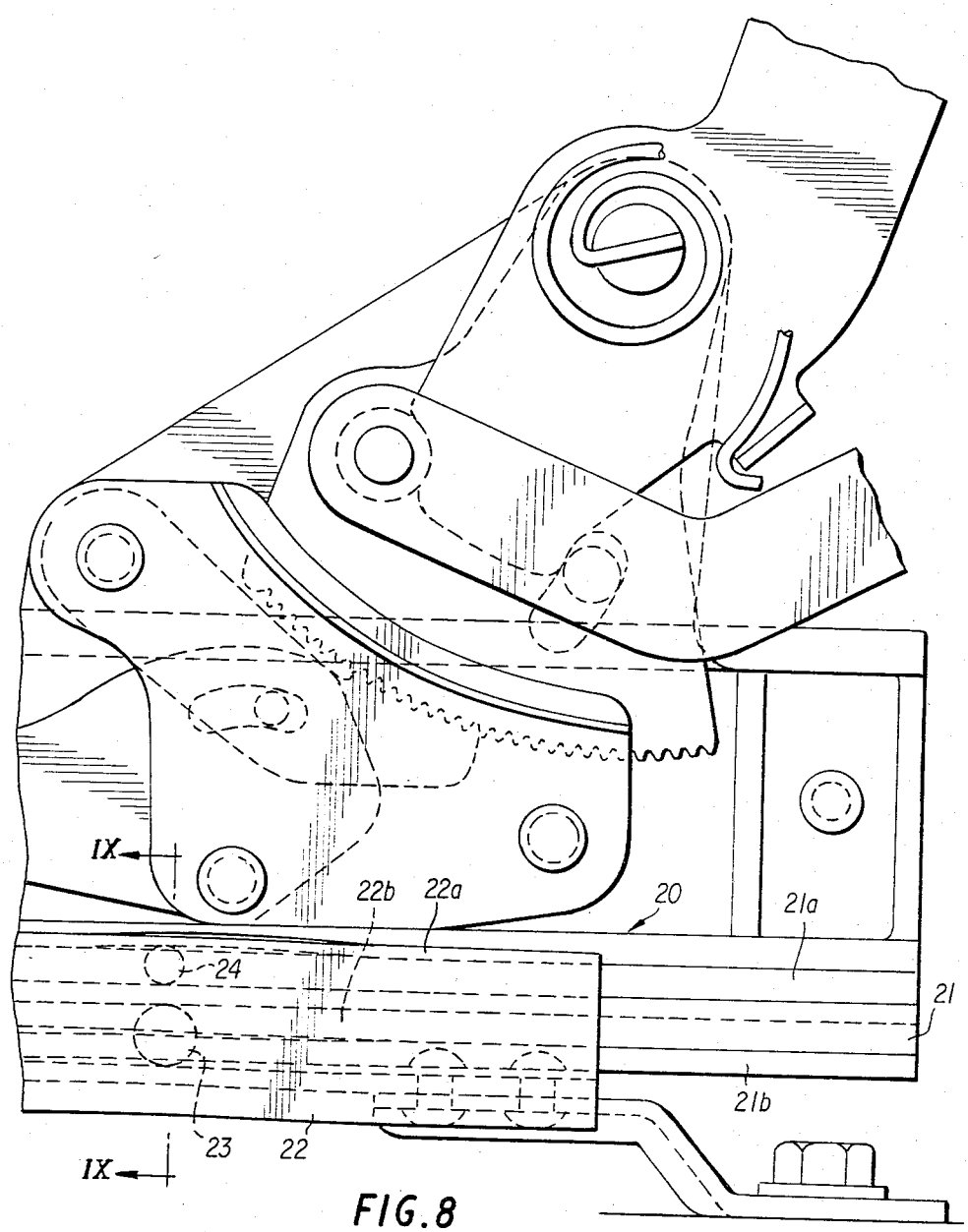
FIG. 8 is a lateral view which shows a transformed state according to the seat track apparatus in FIG. 6.

As shown in FIG. 6, each projecting portion 21a, 21b of the upper rail 21 assembled within the lower rail 22 is opposed to an inner wall face of the lower rail 22 with a slight clearance therebetween through the whole length thereof so that when a large load is upwardly applied on the upper rail 21 as in FIG. 8, both projecting portions 21b, 21b of the upper rail 21 are immediately longitudinally engaged with both projecting portions 22b, 22b of the lower rail 22 and this assuredly prevents the upper rail 21 from undergoing transformation (see FIG. 9).

Figure 10:
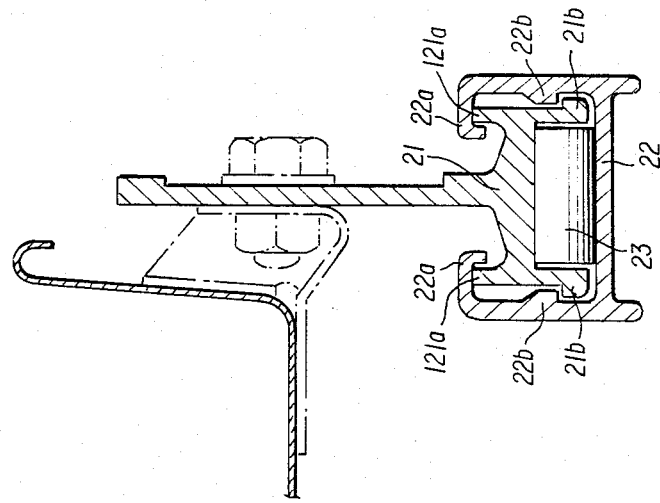

Next referring to FIG. 10, a pair of projecting portions 121a, 121a extend from both shoulders of the upper rail 21 and upper end faces of the projecting portions 121a, 121a are slidably engaged respectively with upper flanges 22a, 22a of the lower rail 22.

Figure 11:
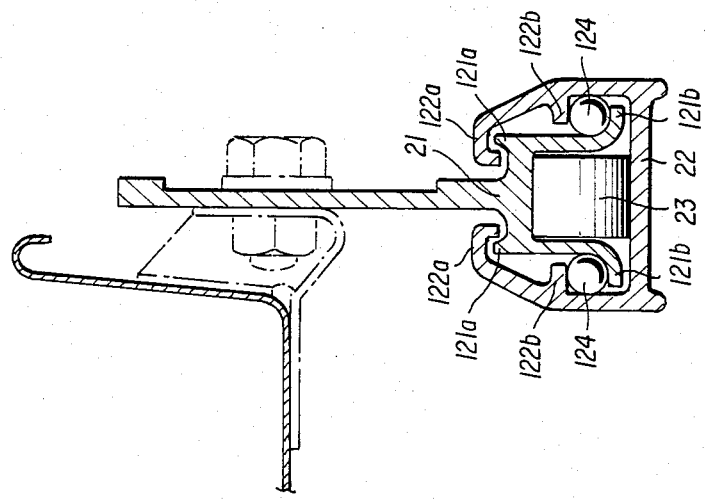
FIGS. 10 and 11 are sectional views which show preferred alternate embodiments according to the present invention.

In FIG. 11, a pair of ball bearings 124, 124 are interposed between lower flanges 121b, 121b formed at the lower end of the upper rail 21 and projecting portions 122b, 122b of the lower rail 22. A pair of projecting portions 121a, 121a formed at both shoulders of the upper rail 21 are opposed to lower faces of upper flanges 122a, 122a of the lower rail 22 through the whole length with a slight clearance.

From the foregoing, there has been disclosed a preferred form of seat track apparatus for vehicle seats constructed in accordance with the present invention. It will be appreciated that various additions, substitutions, modifications and omissions may be made thereto without departing from the spirit of the invention.

What is claimed as new and desired to be secured by Letters Patent of the United States is:

1. A seat track apparatus for a seat of a vehicle, having a chamber floor comprising:
   an upper rail fixedly attached to a lower portion of said vehicle seat and having a reverse U-shaped cross-sectional configuration so as to form opposed shoulders and opposed side walls and including a first pair of projecting portions longitudinally projecting from said opposed shoulders and a second pair of projecting portions longitudinally, laterally extending from said opposed side walls; and
   a lower rail fixedly attached to said floor of said vehicle chamber and having a U-shaped cross-sectional configuration, and including a pair of upper flanges at an upper end portion thereof and a pair of projecting portions corresponding to said pair of projecting portions of said upper rail at said opposed side walls.

2. A seat track apparatus for vehicle seats as set forth in claim 1, wherein upper face portions of said second pair of projecting portions of said upper rail are opposed to lower face portions of said pair of projecting portions of said lower rail and form a slight clearance therebetween.

3. A seat track apparatus for vehicle seats as set forth in claim 1, wherein upper face portions of said first pair of projecting portions of said upper rail are opposed to lower face portions of said pair of upper flanges of said lower rail and form a slight clearance therebetween.

4. A seat track apparatus for vehicle seats as set forth in claim 1 further comprising at least a first and second roller member rollably mounted on a bottom, upper face portion of said lower rail at front and rear portions of said upper rail.

5. A seat track apparatus for vehicle seats as set forth in claim 1 further comprising a pair of ball bearings provided on each of said shoulders of said upper rail.

6. A seat track apparatus for vehicle seats as set forth in claim 1 wherein upper end face portions of said first pair of projecting portions of said upper rail slidably engage with lower face portions of said pair of upper flanges of said lower rail.

7. A seat track apparatus for vehicle seats as set forth in claim 1 further comprising a pair of ball bearings interposed between said second pair of projecting portions of said upper rail and said pair of projecting portions of said lower rail.

8. A seat track apparatus for vehicle seats as set forth in claim 1 further comprising a pair of rollers axially supported at front and rear portions of said upper rail and rollable on a bottom upper face of said lower rail.

* * * * *